Patented Mar. 2, 1954

2,671,056

UNITED STATES PATENT OFFICE 2,671,056

PROCESS OF PREPARING A SILICA SOL

Frederick J. Wolter, Wilmington, Del., assignor to E. I. du Pont de Nemours and Company, Wilmington, Del., a corporation of Delaware No Drawing. Application January 5, 1952, Serial No. 265,195

8 Claims. (Cl. 252—313)

1

This invention is directed to the preparation of silica sols by passing dilute solutions of low-ratio alkali-metal silicates through the ammonium form of a cation-exchanger. The sols thus produced are stabilized by the addition of one portion of the sol to another portion heated to a temperature of 60° C.

It has heretofore been proposed as in Bird 2,244,325 to prepare silica sols by passing alkali-metal silicate solutions through the acid form of a cation-exchanger. The sols thus prepared are very likley to gel. This is particularly true if sodium is removed to such an extent that the pH drops to around 5 to 6. The difficulty is especially great at silica concentrations greater than about 3 per cent.

It has also been proposed to use the ammonium form of cation-exchangers for removing the alkali metal from alkali-metal silicates as in Voorhees 2,457,971. In such processes it was proposed to use silica solutions containing more than 10 per cent $SiO_2$. While this can be done with silicates which have a very high ratio of $SiO_2$ to $Na_2O$ such as are prepared by first treating the silicate with the acid form of a resin they cannot be used practically for ordinary silicates of low ratio. With alkali-metal silicates of low ratio, the deposition of silica on the resin is so excessive as to make the process impossible of commercial accomplishment. The products, moreover, which are made in this way from ordinary alkali metal silicates containing more than 10 per cent $SiO_2$ are extremely subject to gelling.

According to the present invention, the ammonium form of a cation-exchanger is used to remove the alkali metal of a low-ratio alkali-metal silicate in a solution containing less than 7 per cent $SiO_2$. If heated, the silica sols produced are stable only as long as ammonia is present but they may be stabilized by the addition of a strong base or by adding one portion of the sol to another portion, heated to a temperature above about 60° C. The exhausted exchanger may be regenerated by treatment with an ammonium compound.

The alkali metal silicate, such as sodium or potassium silicate, used to prepare sols according to the invention have a mol ratio of $SiO_2:M_2O$ of from 1:1 to 3.9:1. The maximum concentration which can be used can be expressed by the empirical relationship:

$$\frac{7}{3.25} \quad R$$

2 where R is the ratio of $SiO_2:M_2O$. This can, of course, be expressed as 2.16R A solution of a 3.25 ratio silicate accordingly could be used with a maximum of 7 per cent of $SiO_2$ by weight. The solution can contain any smaller amount of silica though it is usually less economic to use smaller amounts than say about 1 per cent $SiO_2$. The advantages of the invention are chiefly realized when the solution contains such quantity of sodium silicate as amounts to more than 4 per cent $SiO_2$ by weight.

According to processes of the invention the sodium silicate solution is passed through the ammonium form of a cation-exchanger. Ordinarily, the cation-exchanger is in finely divided form to permit intimate contact between the solution and the exchanger. The mode of use of cation-exchangers is generally well understood and is describde, for instance, in the Bird patent previously mentioned and in Hurd 2,431,481. The literature also makes many references to suitable forms of equipment and to processes for effecting contact between solutions and cation-exchangers.

Any insoluble cation-exchanger may be used in processes of the invention and there may be used, for instance, sulfonated carbonaceous exchangers or sulfonated or sulfited insoluble phenol-formaldehyde resins or acid-treated humic material, or other similar exchangers. Sulfonated coal, lignin, peat, or other insoluble sulfonated humic organic material may be used.

Even better are the insoluble resins made from phenols, such as those made from phenol itself, diphenylol sulfone, catechol, or naturally occurring phenols, as found, for example, in quebracho, and an aldehyde, particularly formaldehyde, which are modified by the introduction of sulfonic groups either in the ring or on methylene groups.

The exchanger is generally prepared in a granular form which is readily leached free of soluble salts. After the exchanger is exhausted by use, it may readily be converted to the ammonium form by washing with a suitable ammonium compound such as ammonium chloride, ammonium sulfate, ammonium sulfamic, or ammonium nitrate. These materials may be used at a slightly basic pH, for example by the addition of a small amount of an ammonium compound which is basic such as ammonium hydroxide or carbonate.

One of the preferred cation-exchange resins for use according to the present invention is an aromatic hydrocarbon polymer containing nuclear sulfonic acid groups which is designated "Dowex 50" and of the general type described in D'Alelio 2,366,007 and which is fully described as to its characteristics, properties, and general mode of use in the Journal of the American Chemical Society for November 1947, volume 69, No. 11, beginning at page 2830.

The effluent from the cation-exchanger will contain ammonia corresponding to the sodium removed. If an effort is made to concentrate the effluent simply by boiling, the ammonia will be driven off and the sol will gel.

If the sol is to be concentrated by evaporation it should be stabilized by the addition of a strong base. The base should be used in such an amount as to make the pH of the sol fall within the range from about 8 to 10.7.

As suitable bases there may be mentioned sodium hydroxide, sodium silicate, potassium hydroxide, and potassium silicate. If an alkali metal M, such as sodium or potassium, is used as the base, the final molar ratio $SiO_2:M_2O$ should be above about 25:1. It is preferred that the ratio be from about 60:1 to 120:1. After the effluent has been stabilized by the addition of a base as indicated, it can then be concentrated by evaporation. Concentration can be carried to about, say, 10 per cent $SiO_2$ by weight, or even a little higher.

The ammonia which is evolved from the sol can be recovered and can be used to regenerate the cation-exchanger. This can be done by absorbing the ammonia in dilute sulfuric acid to obtain a solution of ammonium sulfate and by passing this through the exchanger. A small excess of ammonia can be present so that the solution will be slightly on the basic side.

Another method which may be used is to regenerate the exchanger with sulfuric acid to get it in the hydrogen form. Then the ammonia given off during the concentration is absorbed in water and passed through the hydrogen form of the cation-exchanger to convert it to the ammonium form. The ammonia gas which is evolved can be absorbed in a water slurry of the exchanger.

It should be observed in regenerating the exchanger that if the hydrogen form is used it must be converted substantially completely to the ammonium form since any significant amount of the hydrogen form of the resin will cause gelling in the resin bed.

More stable products can be made by heating one portion, say, half of the effluent with base added, to a temperature above 60° C. and slowly adding the remainder to it while continuing the heating. Preferably, an even smaller portion of the effluent, say, about a fifth, is first heated and then the remaining portion slowly added over a period of several hours while continuing the heating to a temperature above 60° C. This procedure is described and claimed in U. S. Patent 2,574,902, dated November 13, 1951, of Max F. Bechtold and Omar E. Snyder.

The sols can be concentrated by evaporating some of the water during the heating steps just described.

Processes such as those described can be carried out by heating a portion of the effluent to which no base has been added and then adding further quantities of effluent at such a rate as to compensate for loss of ammonia. The pH should not drop to below about 7.5 and it is better to maintain the pH above 8. A pH between about 8 and 9 would be desirable for this method of operation.

The sols prepared can be concentrated to 30 or up to 35 per cent $SiO_2$. Even higher concentrations, say up to 50 per cent $SiO_2$ can be obtained by deionizing the sols with anion- and cation-exchangers and then adding back a little alkali before concentration.

However, as has already been indicated, it is best to add a strong base which is not volatile so that such rigid control need not be exercised. The pH of the sol with a strong base can be adjusted to pH 8 to 10.7.

In order that the invention may be better understood reference should be had to the following illustrative examples:

*Example 1*

A sodium silicate solution of 3.25 $SiO_2:Na_2O$ mol ratio is made up containing 6 per cent $SiO_2$ by weight. This solution is passed through the ammonium form of "Dowex 50" resin. The effluent contains approximately 6 per cent $SiO_2$ by weight and contains substantially no sodium. The resin is regenerated by washing with ammonium chloride containing a little ammonium hydroxide and used for a later batch.

A small amount of sodium silicate is added to the effluent to bring the ratio of $SiO_2:Na_2O$ to 90:1. The solution is then boiled to concentrate it by evaporation. Ammonia is lost and the solution is concentrated to 10 per cent $SiO_2$. The sol thus obtained is practically clear and is stable for some months.

*Example 2*

An effluent is prepared as in Example 1 and $\frac{1}{10}$ of the total effluent is placed in a receptacle and heated to 95° C., just below the boiling point. The remainder of effluent is slowly added over a period of ten hours. During this time a considerable portion of the ammonia is lost but the solution still remains at a pH above about 8.5. The sol has an $SiO_2$ content of about 6 per cent and this is then concentrated by evaporation to 30 per cent $SiO_2$. During the evaporation a little ammonia gas is added throughout the evaporation to keep the pH above about 8.

*Example 3*

A procedure is followed as in Example 2 but prior to the heating of the effluent, sodium silicate is added in an amount to give an $SiO_2:Na_2O$ ratio of 90:1. Thereafter, $\frac{1}{5}$ of the solution is placed in a receptacle, heated to boiling, and the remaining $\frac{4}{5}$ is slowly and steadily added over a period of five hours during which time water is evaporated to maintain essentially a constant volume. The resulting sol is quite stable and has a molecular weight of around 2,000,000. The $SiO_2$ content by weight is 30 per cent.

This application is a continuation-in-part of my co-pending U. S. application, Serial No. 168,143, filed June 14, 1950, for Process, now abandoned.

I claim:

1. In a process for making a silica sol the step comprising passing through the ammonium form of a cation-exchanger an aqueous solution of an alkali-metal silicate of $SiO_2:M_2O$ ratio from 1:1 to 3.9:1 and having an $SiO_2$ content less than $$\frac{7}{3.25} R$$

per cent where R is said ratio.

2. In a process for making a silica sol the step comprising passing through the ammonium form of a cation-exchanger an aqueous solution of an alkali-metal silicate of $SiO_2:M_2O$ ratio from 1:1 to 3.9:1 and having an $SiO_2$ content less than $$\frac{7\ R}{3.25}$$

per cent were R is said ratio, separating the solution from the exchanger, adding an alkali metal base to the solution in amount to yield a pH above 7.5, and removing ammonia.

3. In a process for making a silica sol the step comprising passing through the ammonium form of a cation-exchanger an aqueous solution of sodium silicate of $SiO_2:Na_2O$ ratio from 1:1 to 3.9:1 and having an $SiO_2$ content less than $$\frac{7\ R}{3.25}$$

per cent where R is said ratio, separating the effluent solution from the exchanger, heating a portion of the effluent solution to a temperature above 60° C., and adding another portion of the effluent solution while continuing to heat, the pH being maintained during said heating above 7.5 by use of a base selected from the group consisting of ammonia and alkali metal bases.

4. In a process for making a silica sol the step comprising passing through the ammonium form of a cation-exchanger an aqueous solution of sodium silicate of $SiO_2:Na_2O$ ratio from 1:1 to 3.9:1 and having an $SiO_2$ content less than $$\frac{7\ R}{3.25}$$

per cent where R is said ratio, separating the effluent solution from the exchanger, heating a portion of the effluent solution to a temperature above 60° C., and adding another portion of the effluent solution while continuing to heat, the pH being maintained during said heating above 8 by adding a basic alkali-metal compound.

5. In a process for making a silica sol the steps comprising passing through the ammonium form of a cation-exchanger a sodium silicate of $SiO_2:Na_2O$ ratio from 1:1 to 3.9:1 and having an $SiO_2$ content by weight less than $$\frac{7\ R}{3.25}$$

per cent where R is said ratio, separating the solution from the exchanger, adding to the effluent solution a sodium compound from the group consisting of sodium hydroxide and sodium silicate in an amount to yield a pH above 7.5 and to give a ratio of sodium to silica such that the $SiO_2:Na_2O$ ratio is above 25:1, heating a portion of the effluent solution to a temperature above 60° C. and adding to this portion another portion of the effluent solution which is at least 4 times as large while heating above 60° C. and concentrating the sol by evaporation to an $SiO_2$ content of at least 10 per cent.

6. In a cyclic process for making a silica sol the step comprising passing through the ammonium form of a cation-exchanger an aqueous solution of an alkali-metal silicate of $SiO_2:M_2O$ ratio from 1:1 to 3.9:1 and having an $SiO_2$ content less than $$\frac{7\ R}{3.25}$$

per cent where R is said ratio, separating the solution from the exchanger, adding an alkali metal base to the solution in amount to yield a pH above 7.5, removing ammonia, regenerating the cation-exchanger to the ammonium form with said ammonia, and returning said cation-exchanger to the process for treatment of a further quantity of silicate.

7. In a process for making a silica sol by withdrawing alkali metal from a soluble alkali metal silicate, the steps comprising contacting the ammonium form of a cation-exchanger with an aqueous solution of an alkali-metal silicate of $SiO_2:M_2O$ ratio from 1:1 to 3.9:1 and having an $SiO_2$ content less than $$\frac{7\ R}{3.25}$$

per cent where R is said ratio, and continuing such contact until enough alkali metal has been removed to raise the $SiO_2:M_2O$ ratio above 25.1.

8. In a process for making a silica sol by withdrawing sodium from a soluble sodium silicate, the steps comprising contacting the ammonium form of a cation-exchanger with an aqueous solution of sodium silicate of $SiO_2:Ma_2O$ ratio below 3.9:1 and having an $SiO_2$ content of at least 4% but less than $$\frac{7\ R}{3.25}$$

per cent where R is said ratio, and continuing such contact until enough sodium has been removed to raise the $SiO_2:Ma_2O$ ratio above 60:1.

FREDERICK J. WOLTER.

References Cited in the file of this patent
UNITED STATES PATENTS

| Number | Name | Date |
|---|---|---|
| 2,457,971 | Voorhees | Jan. 4, 1949 |